United States Patent
Polycarpou et al.

(10) Patent No.: US 6,542,334 B2
(45) Date of Patent: *Apr. 1, 2003

(54) EDGE STRUCTURE FOR SLIDER-DISC INTERFACE AND METHOD OF MANUFACTURE THEREFOR

(75) Inventors: Andreas A. Polycarpou, Eden Prairie, MN (US); Mary C. Hipwell, Minneapolis, MN (US); Zine-Eddine Boutaghou, Vadnais Heights, MN (US)

(73) Assignee: Seagate Technology LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/376,192

(22) Filed: Aug. 18, 1999

(65) Prior Publication Data

US 2002/0039256 A1 Apr. 4, 2002

Related U.S. Application Data

(60) Provisional application No. 60/109,223, filed on Nov. 18, 1998.

(51) Int. Cl.[7] .............................. G11B 5/60; G11B 21/21
(52) U.S. Cl. ................... 360/235.3; 360/236.4; 360/236.5
(58) Field of Search ............... 360/234.3, 235.1, 360/235.2, 235.4, 235.9, 235.6, 235.7, 236.3, 236.4, 236.5, 237, 235.3, 236.7, 236.6

(56) References Cited

U.S. PATENT DOCUMENTS

| | | | |
|---|---|---|---|
| 3,919,717 A | 11/1975 | Cullen et al. | 360/122 |
| 4,863,809 A * | 9/1989 | Brar et al. | 360/235.1 |
| 4,998,174 A * | 3/1991 | Wada et al. | 360/234.3 |
| 5,023,738 A | 6/1991 | Prenosil | 360/122 |
| 5,159,508 A | 10/1992 | Grill et al. | 360/103 |
| 5,175,658 A | 12/1992 | Chang et al. | 360/103 |
| 5,198,934 A | 3/1993 | Kubo et al. | 360/104 |
| 5,285,337 A | 2/1994 | Best et al. | 360/97.02 |
| 5,296,982 A | 3/1994 | Terada et al. | 360/103 |
| 5,336,550 A | 8/1994 | Ganapathi et al. | 428/216 |
| 5,384,195 A | 1/1995 | Bachmann et al. | 428/408 |
| 5,408,373 A | 4/1995 | Bajorek et al. | 360/104 |
| 5,443,888 A | 8/1995 | Murai et al. | 428/143 |
| 5,473,486 A | 12/1995 | Nepela et al. | 360/103 |
| 5,499,149 A | 3/1996 | Dovek | 360/103 |
| 5,609,948 A | 3/1997 | David et al. | 428/216 |
| 5,654,850 A | 8/1997 | Ganapathi et al. | 360/103 |
| 5,774,303 A * | 6/1998 | Teng et al. | 360/235.2 |
| 5,781,377 A | 7/1998 | Koka et al. | 360/103 |
| 5,796,551 A | 8/1998 | Samuelson | 360/103 |
| 5,841,608 A | 11/1998 | Kasamatsu et al. | 360/103 |
| 5,864,452 A | 1/1999 | Hirano et al. | 360/122 |
| 5,910,864 A * | 6/1999 | Hira et al. | 360/235.9 |
| 5,986,851 A | 11/1999 | Angelo et al. | 360/103 |
| 6,040,959 A * | 3/2000 | Kobayashi et al. | 360/235.9 |
| 6,069,769 A * | 5/2000 | Dorius et al. | 360/235.6 |

FOREIGN PATENT DOCUMENTS

| | | |
|---|---|---|
| JP | 63-91815 | 4/1988 |
| JP | 1-258218 | 10/1989 |
| JP | 3-214478 | 9/1991 |
| JP | 5-28429 | 2/1993 |
| JP | 6-12615 | 1/1994 |
| JP | 6-119628 | 4/1994 |
| JP | 8-297813 | 11/1996 |

* cited by examiner

Primary Examiner—David L. Ometz
(74) Attorney, Agent, or Firm—Westman, Champlin & Kelly, P.A.

(57) ABSTRACT

A slider for improved head-disc interface. The slider includes a slider body, an air bearing and edge surfaces. Edge surfaces of the slider include a rounded edge surface having a deposited edge covering for head-disc interface.

21 Claims, 9 Drawing Sheets

EDGE STRUCTURE FOR SLIDER-DISC INTERFACE AND METHOD OF MANUFACTURE THEREFOR

The present invention claims priority to Provisional Application Ser. No. 60/109,223, filed Nov. 18, 1998, entitled "SMOOTHED, ROUNDED SLIDER AND ABS EDGES/CORNERS FOR REDUCED DAMAGE DURING HEAD-DISC IMPACT."

BACKGROUND OF THE INVENTION

The present invention relates to data storage systems. More specifically, the present invention relates to an edge contact protection feature for sliders of a data head of a data storage system.

Disc drives are used to store digitally encoded information. Sliders support transducer elements for reading and/or writing data to the disc surface. The slider includes an air bearing to raise the slider to fly above the disc surface via rotation of the discs for operation of the transducer elements. In a magnetic-type disc drive, it is known that improved magnetic interaction between the disc surface and the transducer element can be achieved by reducing the spacing between the slider and the disc surface. With closer flying distance between the slider and the disc surface, there is an increased propensity for contact between the slider and disc surface which can damage the disc surface. Contact between the slider and disc surface may be caused by vibration and shock during operation of the disc drive.

Additionally, the disc surface may be susceptible to contact or impact during load and unload operations. In a dynamic ramp load system, corner edges of the slider are susceptible to contact with the disc surface. For contact starts and stops ("CSS") drives sliders are parked on the landing zone of the disc surface prior to operation. Non-operational shock introduced during shipping or handling the drive may cause the slider to slam into the disc surface or during "spin up" or "spin-down" dynamic interaction can result in significant head-disc contact.

A slider may include rough or sharp edges due to the fabrication process. When the slider contacts or slams into the disc, the rough or sharp edges may damage the disc surface. One technique used to reduce damage introduced by contact between the slider and disc surface is to "blend" or round the edges of the slider to limit damaging contact between the disc surface and slider. Blending can produce a rough surface structure which can damage a disc surface and can cause debris generation at the head-disc interface. Debris can degrade disc lubricant and can pile on the disc surface interfering with read and write operations. These and other problems are addressed by the present invention.

SUMMARY OF THE INVENTION

The present invention relates to a slider for improved head-disc interface. The slider includes a slider body, an air bearing and edge surfaces. Edge surfaces of the slider are rounded and include a deposited edge covering for head-disc interface.

DETAILED DESCRIPTION OF THE PREFERRED EMBODIMENTS

Figure 1:
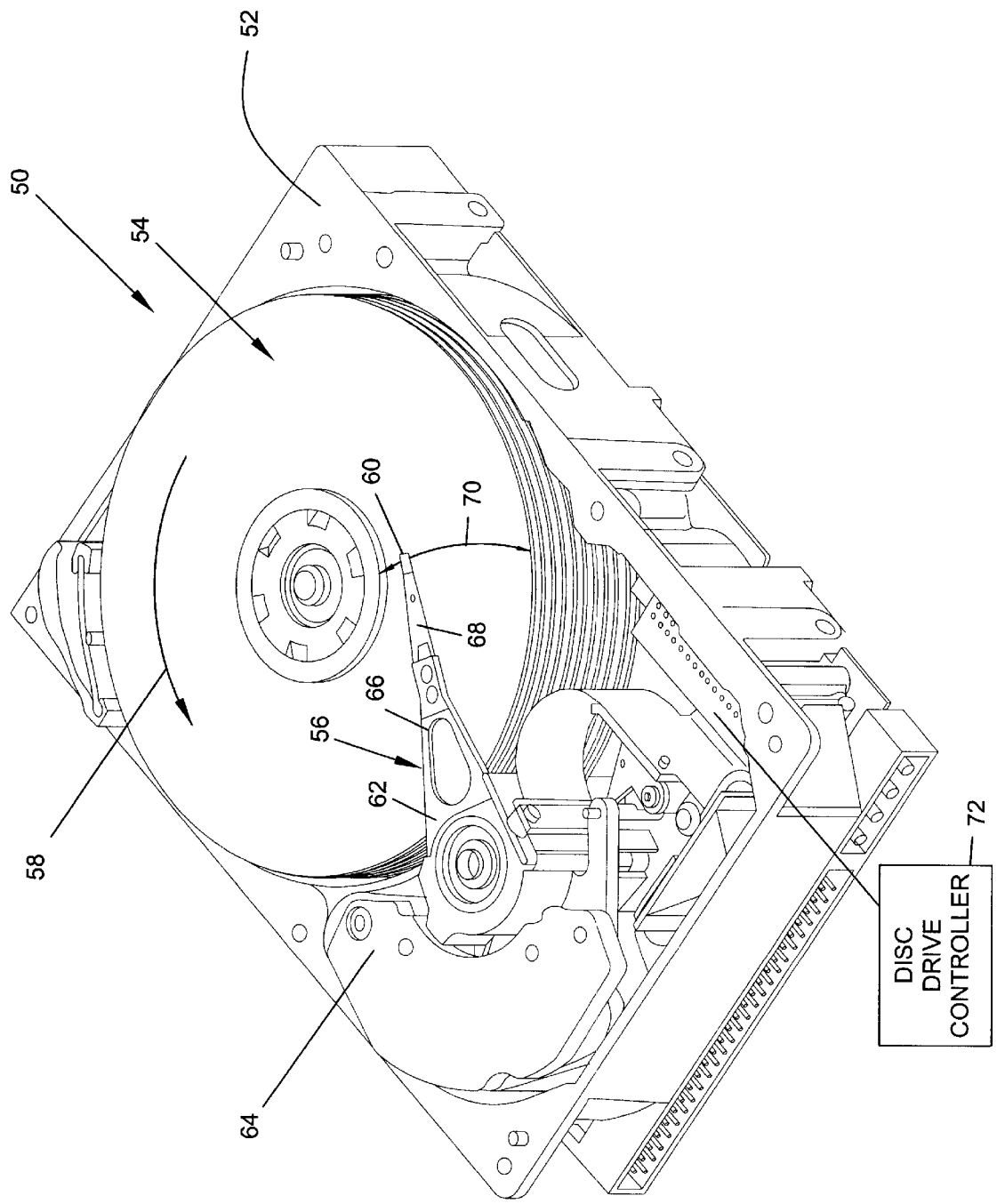
FIG. 1 is a perspective view of a disc drive.

FIG. 1 illustrates a disc drive 50 including a chassis 52, discs 54, and actuator assembly 56. Discs 54 are rotationally coupled to chassis 52 via a spindle motor (not shown) for rotation, as illustrated by arrow 58. Actuator assembly 56 rotationally supports heads 60 for reading and/or writing data to and from discs 54. The actuator assembly includes E-block 62 and a voice coil motor (VCM) 64. As shown, E-block 62 is rotationally coupled to chassis 52. The E-block 62 includes a plurality of actuator arms 66 (only one shown in FIG. 1). Suspension assemblies 68 are coupled to the actuator arms 66 to support heads 60 relative to the disc surface. The E-block rotates as illustrated by arrow 70 to move heads 60 along an arcuate path for placement relative to data tracks of a disc 54 to read or write data relative to the disc surface. Movement of the E-block 62 is controlled by voice coil motor 64, which is coupled to drive circuitry of the disc drive illustrated by block 72. Operation of the spindle motor (not shown) is also coupled to drive circuitry.

Figure 2:
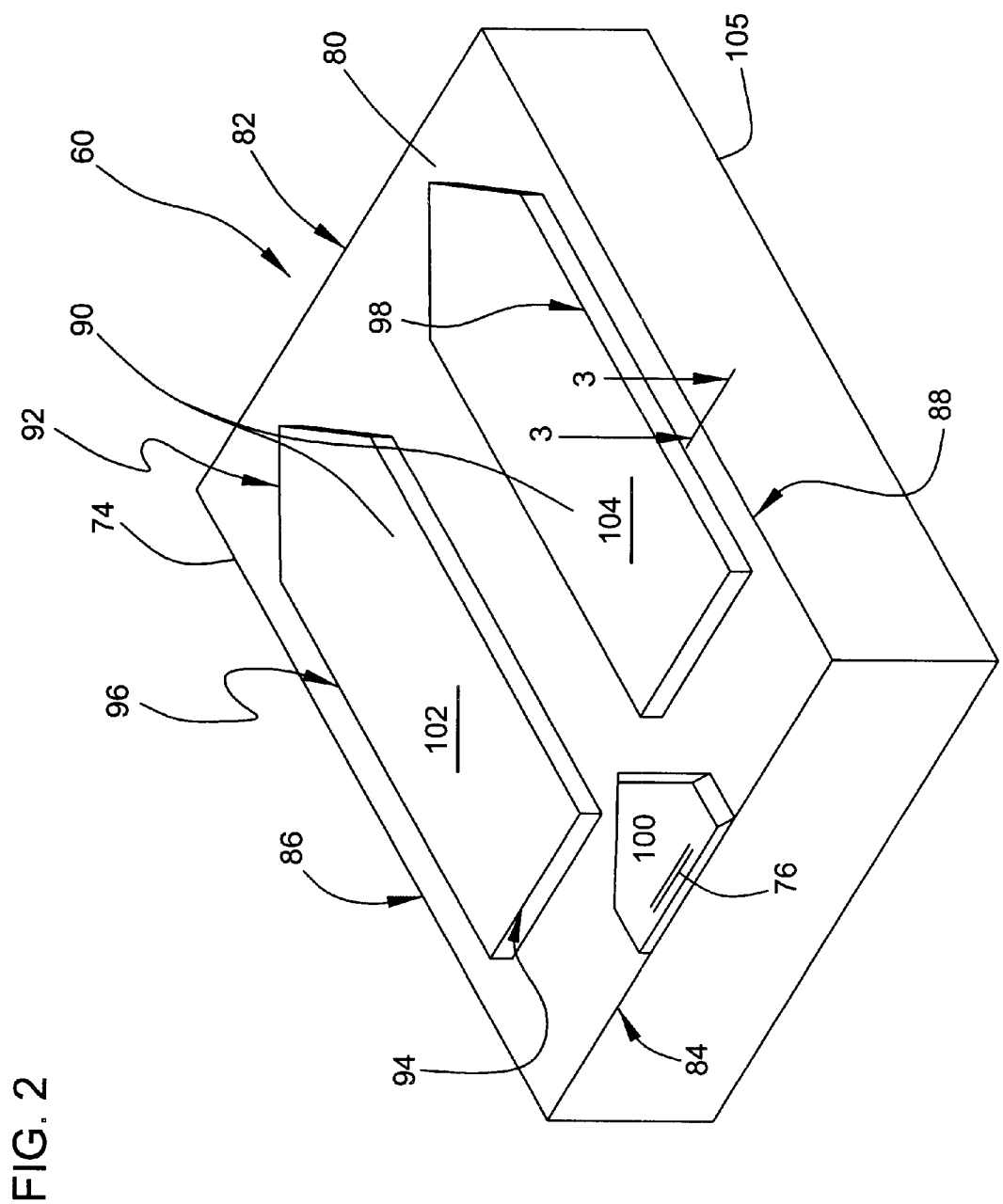
FIG. 2 is a perspective view of an embodiment of a slider supporting transducer elements.

FIG. 2 illustrates head 60 which includes a slider 74 supporting transducer elements 76 (illustrated schematically) for read and write operations. Transducers can be inductive type transducers, magneto-optical transducers or magnetoresistive transducers. As shown in FIG. 2, slider 74 includes a slider body 80 having a leading edge surface 82, a trailing edge surface 84 and opposed side edge surfaces 86, 88. An air bearing 90 extends from slider body 80 and is elevated above slider body 80. Air bearing 90 includes leading, trailing and side edge surfaces 92, 94, 96, 98.

In the embodiment shown, air bearing 90 include a center rail 100 supporting transducers 76 and raised side rails 102 104. Interaction between air bearing 90 and rotating disc 54 creates a hydrodynamic lifting force in a known manner for operation of the disc drive. An upper surface 105 of the slider 74 is connected to suspension assembly 68 to support the slider for read and write operations. During operation, the slider 74 may contact into the disc surface due to vibration or shock. The slider 74 may also contact asperities in the disc surface causing head-disc contact. The slider can also contact the disc surface during CSS and load and unload operations. Non-operational shocks introduced during shipping or handling can also cause a slider parked on the disc surface to slam into the disc surface.

Figure 3:
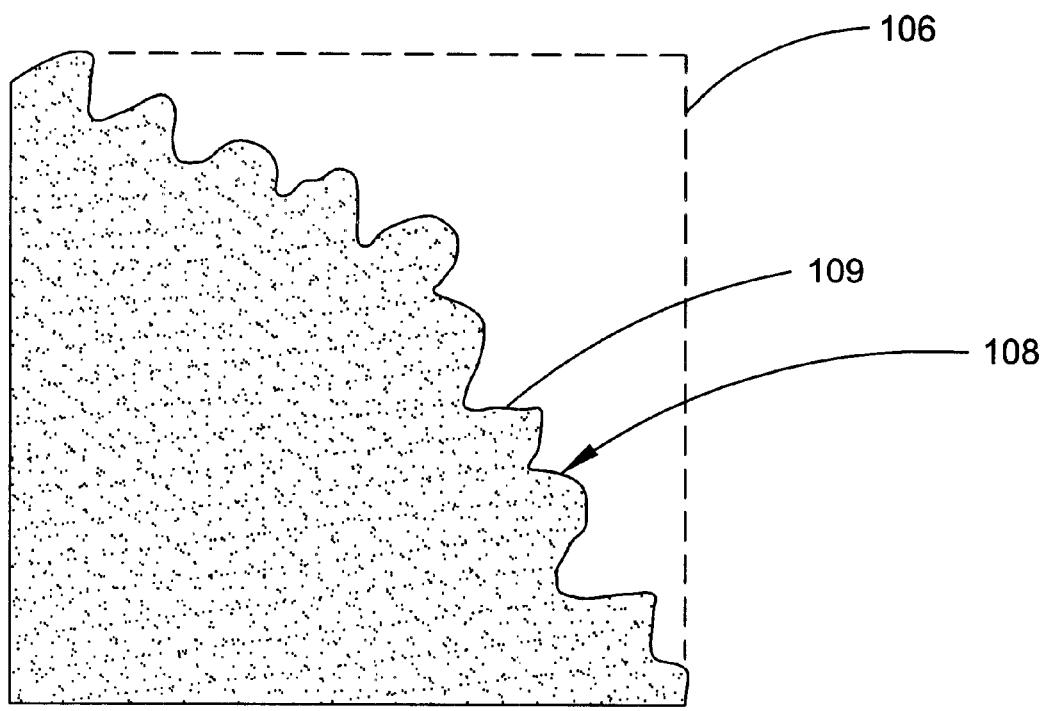
FIG. 3 is a detailed illustration of a rough surface structure for edge surfaces of a blended or rounded slider.

Sliders 74 are cut from a wafer or slider bar (not shown). Cut edges and corners of slider 74 as well as other fabricated edge surfaces (e.g. edges of the air bearing) are sharp as illustrated in phantom 106 in FIG. 3 and can include rough edges or burrs. Sharp edge surfaces of the slider 74 can damage the disc surface during head disc contact. To limit damage due to head-disc contact, edges of the slider are rounded or blended 108 as illustrated in FIG. 3 to minimize contact between sharp slider edge surfaces and the disc surface. Known rounding or "blending" processes include mechanical grinding, chemical etching and ion milling.

Blended edge surfaces produce a rough surface structure 109 due to different rates of milling/etching and due to process controllability. The degree of roughness is more severe for multiphase slider materials, such as $Al_2O_3$—TiC. Impact between the rough surface structure 109 can damage the disc surface. Also, contact between the rough surface structure and the disc surface can loosen particles from the rounded or blended surface which deposit on the disc surface and lead to asperities, lubricant degradation and interfere with read and write operations of a disc drive.

Figure 4:
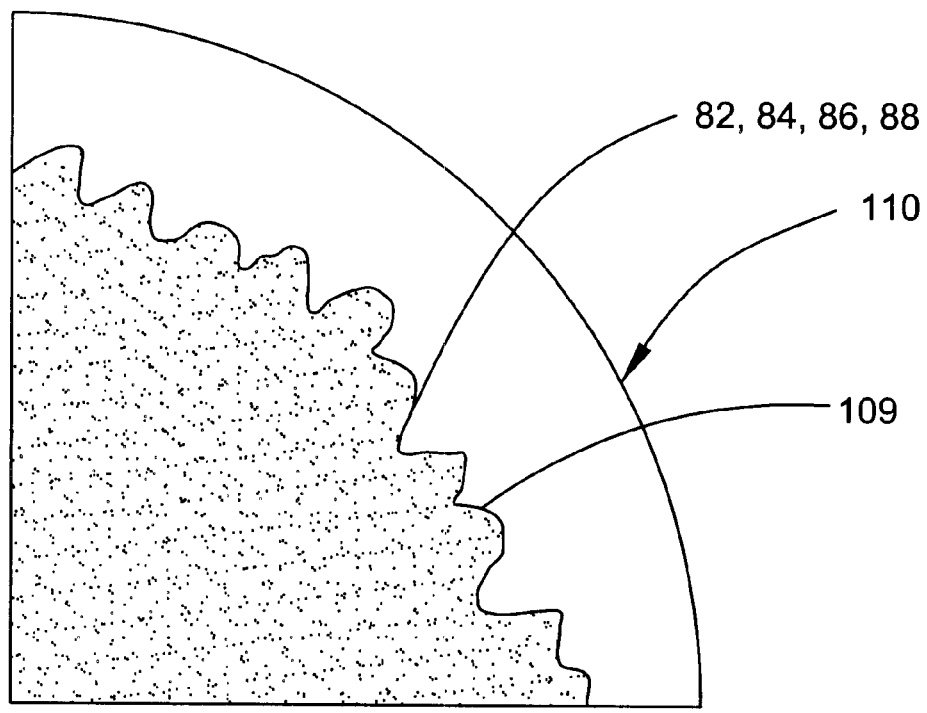
FIG. 4 is a detailed illustration of an embodiment of an edge covering of the present invention.

In one embodiment of the slider of the present invention, rounded edge surfaces are protected by an edge cover 110 as illustrated in FIG. 4. Edge cover 110 is applied to blended or rounded edge surfaces 109 of the slider for improved head-disc contact. The thickness of the edge cover 110 is sufficient to fill in or cover the rough surface structure and provide a smooth outer surface for interface with the disc surface, as illustrated in FIG. 4. In one embodiment, the protective cover 110 is formed of a diamond-like carbon layer to provide a relatively wear resistant tribological surface for head-disc contact. In another embodiment, edge cover 110 is formed of a relatively soft energy-absorbing layer such as polymeric material for example, Parylene, to absorb and dissipate impact energy at head-disc interface.

Figure 5:
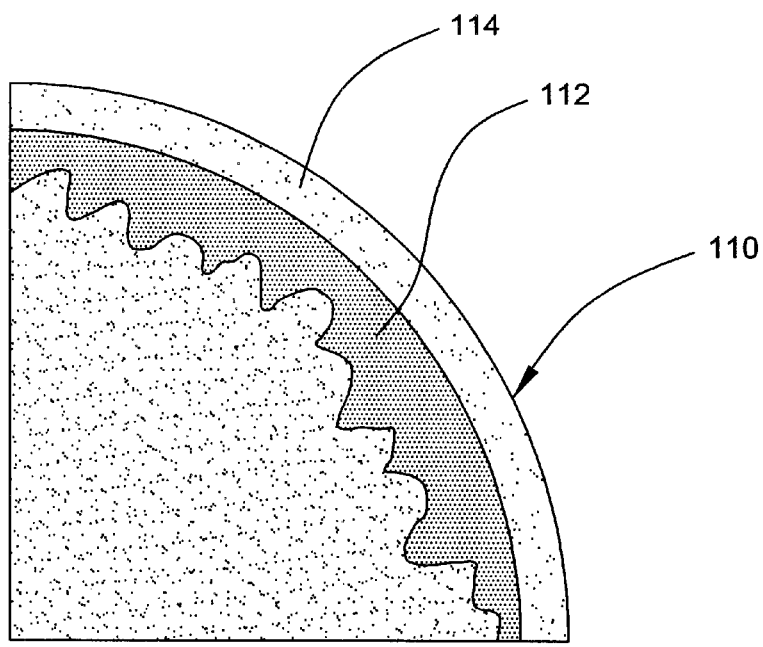
FIG. 5 is a detailed illustration of an alternate embodiment of an edge covering of the present invention.
Figure 6:
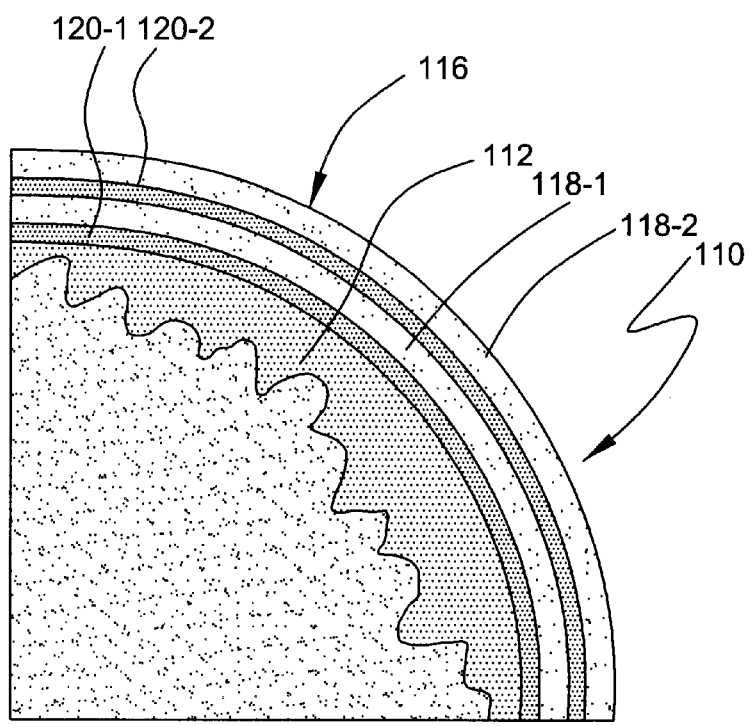
FIG. 6 is a detailed illustration of an alternate embodiment of an edge covering of the present invention.

FIG. 5 illustrates an alternate embodiment of the slider of the present invention. As shown, edge cover 110 includes a first energy absorbent layer 112 formed of a soft polymeric or energy absorbent material and a second outer tribological or smooth layer 114 formed of a relatively wear resistant material such as a diamond-like carbon. Absorbent layer 112 provides energy absorption and outer layer 114 provides a tribological wear resistent layer for head-disc contact. In another alternate embodiment illustrated in FIG. 6, edge cover 110 includes a first energy absorbent layer 112 and a composite outer layer 116. The composite outer layer 116 is formed of alternate layers of diamond-like carbon 118-1, 118-2 and adhesive layers 120-1 and 120-2 for head-disc interface.

Figure 7:
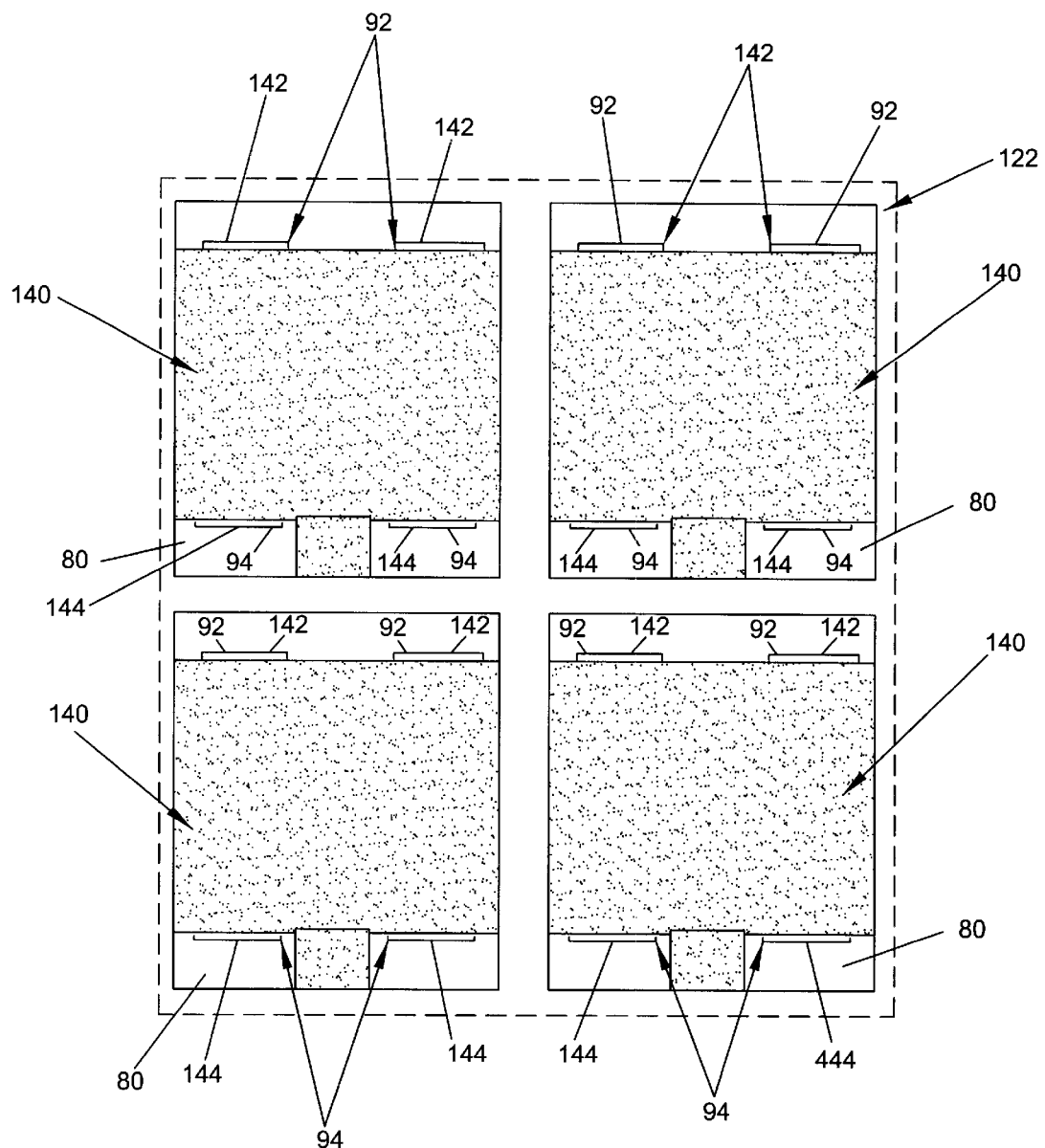
FIG. 7 illustrates an embodiment for fabricating sliders of the present invention.

Multiple sliders are fabricated on a carrier 122 as diagrammatically illustrated in FIG. 7. FIG. 7 illustrates an embodiment of a fabrication process for fabricating air bearing edge surfaces. As shown, air bearing 90 is fabricated on slider bodies 80 via known masking techniques. In the embodiment illustrated in FIG. 7, a photoresist mask or layer 140 is applied to the air bearing on the carrier level 141 or bar level. The photoresist layer or mask 140 is spaced from leading and trailing edges 142, 144 of the air bearing to expose leading and trailing air bearing edge surfaces 92, 94. Exposed edge surfaces are blended and cover 110 is applied to exposed blended edge surfaces in the embodiment shown.

Figure 8:
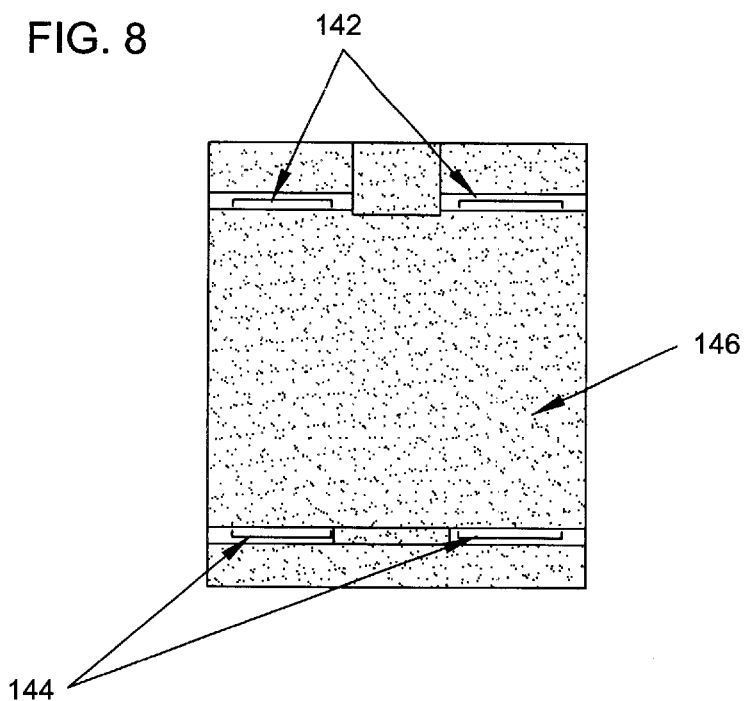
FIG. 8 illustrates another embodiment for fabricating sliders of the present invention.
Figure 9:
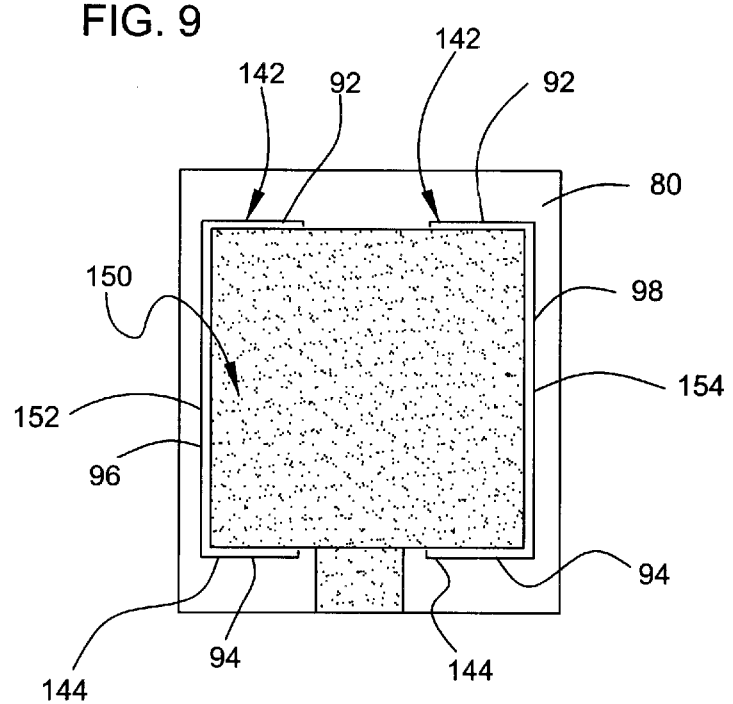
FIG. 9 illustrates another embodiment for fabricating sliders of the present invention.

FIG. 8 illustrates an alternate photoresist layer 146 spaced from leading and trailing edges 142, 144 for exposing leading and trailing edge surfaces 92, 94 of the air bearing for fabrication. In an alternate embodiment illustrated in FIG. 9, a photoresist mask or layer 150 is applied to air bearing 90 spaced from leading, trailing and side edges 142, 144, 152, 154 to expose leading, trailing and side edges surfaces 92, 94, 96. 98 of the air bearing surface. Exposed leading, trailing and side edge surfaces 92, 94, 96, 98 are blended and cover 110 is applied to the exposed blended edge surfaces.

Figure 10:
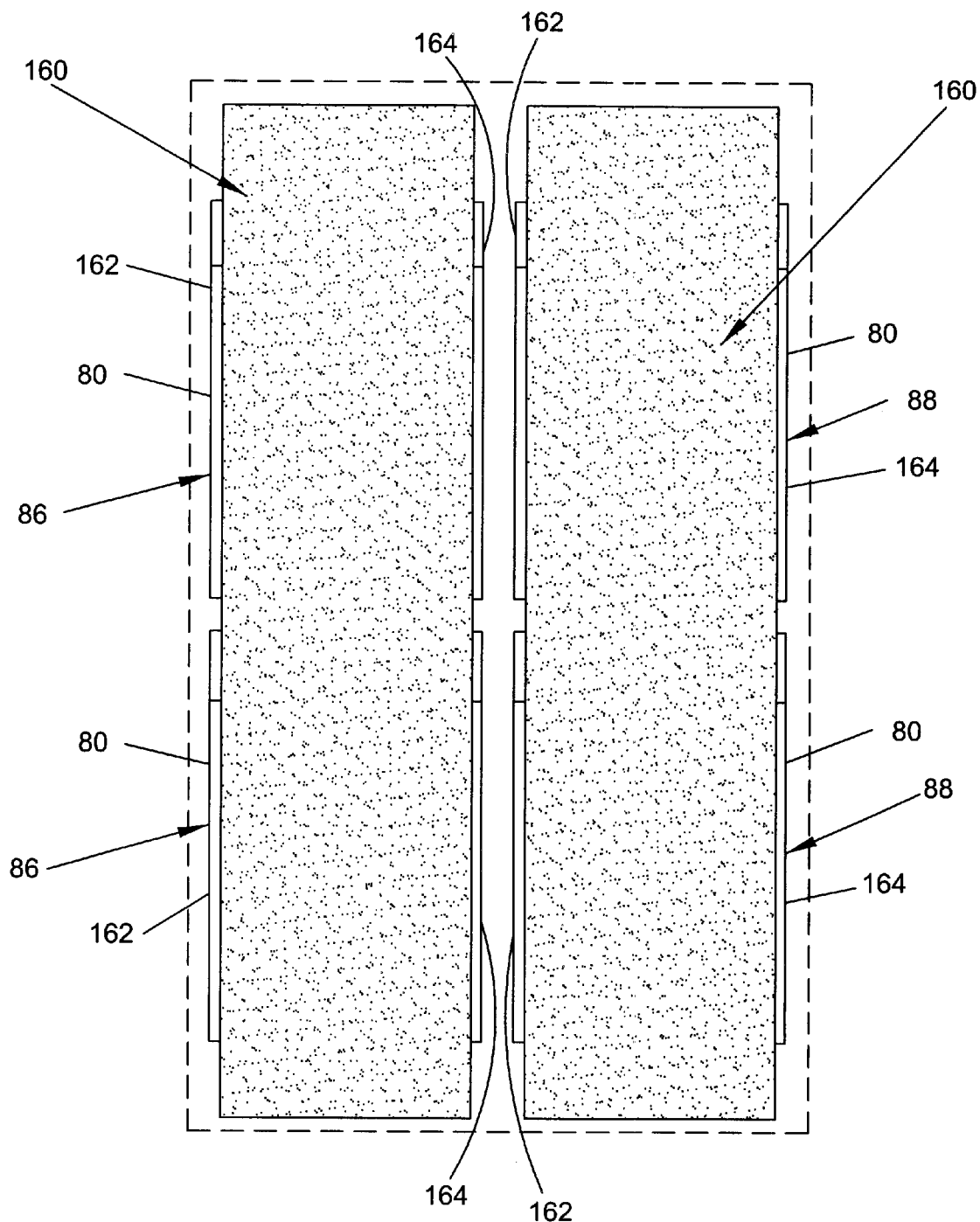
FIG. 10 illustrates an embodiment for fabricating edges of a slider body.
Figure 11:
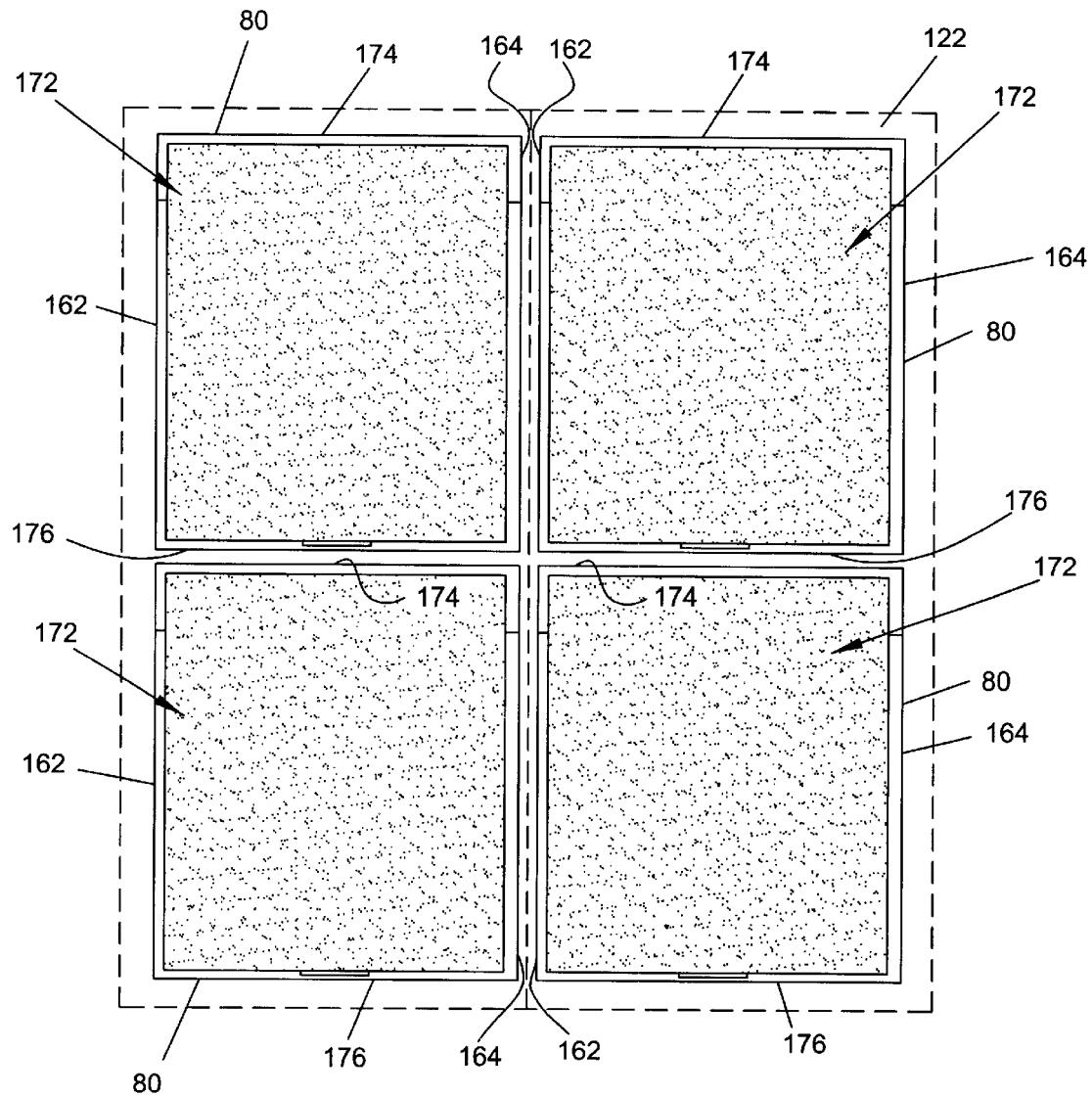
FIG. 11 illustrates another embodiment for fabricating edges of a slider body.

FIGS. 10–11 illustrate embodiments for fabricating a slider body 80 including the deposited edge structure of the present invention. In one embodiment illustrated in FIG. 10, photoresist layer 160 is applied to the slider body 80 spaced from side edges 162, 164 and exposed side edge surfaces are blended 86, 88. Cover 110 is applied to the exposed side edge surfaces 86, 88 of the slider body 80 along the length thereof.

In another embodiment shown in FIG. 11, photoresist layer 172 is applied on the carrier level 141 to the slider body 80 spaced from leading, trailing and side edges 174, 176, 162, 164 of the slider body 80. Sliders are separated or sliced from a bar as illustrated by dotted line so that leading, trailing and side edge surfaces 82, 84, 86, 88 are exposed. Exposed edge surfaces 82, 84, 86, 88 are blended and a cover 110 is applied over the blended edge surfaces 82, 84, 86, 88 of the slider body 80. Although embodiments of the invention are illustrated with reference to a particular bearing design, it should be understood that alternate bearing designs may be used and application is not limited to a particular bearing design.

Although the present invention has been described with reference to preferred embodiments, workers skilled in the art will recognize that changes may be made in form and detail without departing from the spirit and scope of the invention.

What is claimed is:

1. A slider comprising;
    a slider body;
    an air bearing including a raised bearing surface and a recessed bearing surface on the slider body and the raised bearing surface including a generally raised planar surface area; and
    leading, trailing and side edges at least one of the leading, trailing or side edges including a rounded edge surface having a deposited edge covering including a multiple layer structure including an energy absorbent layer and a tribological layer.

2. The slider of claim 1 wherein the energy absorbent layer is a polymer coating.

3. The slider of claim 1 wherein the tribological layer is formed of a diamond-like carbon layer.

4. The slider of claim 1 wherein the rounded edge surface is rounded by a mechanical grinding, chemical etching or ion milling process.

5. The slider of claim 1 wherein the slider body includes the leading, trailing and side edges and the leading and trailing edges include the rounded edge surface having the deposited edge covering.

6. The slider of claim 1 wherein the slider body includes the side edges and the side edges include the rounded edge surface having the deposited edge covering.

7. A slider comprising a slider body including an air bearing including a raised bearing surface on the slider body and the raised bearing surface including a raised generally planar surface area and the slider body includes leading, trailing and side edges and the raised bearing surface includes a raised edge spaced from at least one of the leading, trailing and side edges of the slider body and the raised edge includes a rounded edge surface having a deposited edge covering.

8. The slider of claim 7 wherein the raised bearing surface includes leading and trailing raised edges and the leading and trailing raised edges include the rounded edge surface having the deposited edge covering.

9. The slider of claim 7 wherein the raised bearing surface includes raised side edges spaced from the side edges of the slider body and the raised side edges include the rounded edge surface having the deposited edge covering.

10. A slider comprising:
    a slider body including a raised bearing surface and a recessed bearing surface and the raised bearing surface including a generally planar raised surface area for hydrodynamic operation; and
    contact interface means for head-disc interface for the slider body and the raised bearing surface spaced from edge surfaces of the slider body.

11. The slider of claim 10 wherein the contact interface means for the slider body includes rounded side edges including a deposited edge covering.

12. The slider of claim 10 wherein the contact interface means for the slider body includes rounded leading and trailing edges with a deposited edge covering.

13. The slider of claim 10 wherein the contact interface means for the raised bearing surface includes rounded raised leading and trailing edges including a deposited edge covering.

14. The slider of claim 10 wherein the contact interface means for the raised bearing surface includes rounded raised side edges including a deposited edge covering.

15. A data storage device having a ramp load/unload system comprising:
    at least one disc;
    a head to read or write data to the at least one disc including a slider and the slider including:
        an air bearing including a raised bearing surface and a recessed bearing surface on a slider body and the raised surface including a raised generally planar surface area to provide a hydrodynamic surface; and
        leading, trailing and side edges, at least one of the leading, trailing or side edges including a rounded surface having a deposited edge covering including a multiple layer structure including an energy absorbent layer and a tribological layer.

16. A slider comprising:
    a slider body including an edge including a rounded edge surface and a deposited edge covering; and
    a raised bearing surface on the slider body including a raised edge spaced from the edge of the slider body and including a rounded edge surface and a deposited edge covering.

17. The slider body of claim 16 wherein the slider body includes leading, trailing and side edges and the leading, trailing and side edges include the rounded edge surface and the deposited edge covering.

18. The slider of claim 16 wherein the raised bearing surface includes leading, trailing and side raised edges and the leading, trailing and side raised edges include the rounded edge surface and the deposited edge covering.

19. The slider of claim 16 wherein the slider body ad the raised bearing surface include leading and trailing edges and the leading and trailing edges of the slider body and the raised bearing surface include the rounded edge surface and the deposited edge covering.

20. The slider of claim 16 wherein the slider body and the raised bearing surface include side edges and the side edges of the raised bearing surface are spaced from the side edges of the slider body and the side edges of the slider body and the raised bearing surface include the rounded edge surface and the deposited edge covering.

21. The slider of claim 16 wherein the deposited edge covering is formed of a polymer material.

\* \* \* \* \*